(12) United States Patent
Downer et al.

(10) Patent No.: US 6,593,962 B1
(45) Date of Patent: Jul. 15, 2003

(54) IMAGE RECORDING FOR A DOCUMENT GENERATION SYSTEM

(75) Inventors: Raymond J. Downer, Bedford, NH (US); Charles F Duggan, Merrimack, NH (US)

(73) Assignee: Imaging Automation, Inc., Bedford, NH (US)

( * ) Notice: Subject to any disclaimer, the term of this patent is extended or adjusted under 35 U.S.C. 154(b) by 0 days.

(21) Appl. No.: 09/573,738

(22) Filed: May 18, 2000

(51) Int. Cl.⁷ .......................... H04N 5/232; H04N 9/74
(52) U.S. Cl. ................... 348/211.99; 348/586; 348/587
(58) Field of Search .................. 348/207.99, 207.1, 348/207.2, 239, 586, 587, 585, 584, 722, 211.99; 396/2, 3; 382/164, 173, 282, 286, 162, 163; 345/589, 590, 591

(56) References Cited

U.S. PATENT DOCUMENTS

| | | | |
|---|---|---|---|
| 4,393,394 A | 7/1983 | McCoy ........................ 358/22 |
| 4,537,504 A | 8/1985 | Baltes et al. | |
| 4,634,872 A | 1/1987 | Janus et al. | |
| 4,922,109 A | 5/1990 | Bercovitz et al. | |
| 5,045,426 A | 9/1991 | Maierson et al. | |
| 5,060,171 A | * 10/1991 | Steir et al. ................... 345/630 |
| 5,117,283 A | * 5/1992 | Kroos et al. ................. 348/586 |
| 5,295,196 A | 3/1994 | Raterman et al. | |
| 5,321,470 A | 6/1994 | Hasuo et al. | |
| 5,343,386 A | * 8/1994 | Barber ........................... 396/2 |
| 5,410,642 A | * 4/1995 | Hakamatsuka et al. ..... 358/1.14 |
| 5,446,515 A | 8/1995 | Wolfe et al. ................. 354/290 |
| 5,486,686 A | 1/1996 | Zdybel, Jr. et al. | |
| 5,640,553 A | 6/1997 | Schultz | |
| 5,719,948 A | 2/1998 | Liang | |
| 5,742,807 A | 4/1998 | Masinter | |
| 5,754,673 A | 5/1998 | Brooks et al. | |
| 5,771,315 A | 6/1998 | Matsuyama | |
| 5,838,310 A | * 11/1998 | Uya ............................ 348/587 |
| 5,913,019 A | * 6/1999 | Attenberg ................... 358/1.18 |
| 5,986,718 A | * 11/1999 | Barwacz et al. ............ 348/586 |
| 6,049,674 A | * 4/2000 | Yamamoto et al. ............ 396/2 |
| 6,441,865 B1 | * 8/2002 | Hailey ........................ 348/586 |

OTHER PUBLICATIONS

Abstract of Japan Publication No. JP 06 233179, Sasaki Toshihiko, in English.
Abstract of Japan Publication No. JP 07 222046, Ito Miki, in English.

* cited by examiner

Primary Examiner—Wendy R. Garber
Assistant Examiner—Luong Nguyen
(74) Attorney, Agent, or Firm—Mark S. Leonardo; Brown Rudnick Berlack Israels LLP

(57) ABSTRACT

An automated image recording and document generation system is disclosed that generates identity documents using image and text information that is input to the system using computer controlled video cameras. The image and text information is combined with other stored images, such as logos, signatures and seals, to produce official identity documents such as identity cards, drivers licenses and passports. Prior to use the system automatically enters a setup and calibration phase wherein a video camera images a backdrop having borders on the left and right vertical edges and the digitized video output is analyzed to adjust the camera zoom and to locate the center of the backdrop in front of which an individual will sit or stand to have their picture taken. The image of a person whose picture is taken is analyzed and is centered horizontally in a picture by adding or subtracting columns of background color to the left or right side of the picture as needed. The system also adjusts the iris of the camera for brightness. After setup an individual whose picture is to be taken is positioned in front of the backdrop and their picture is taken. The picture is analyzed to locate the edges of the face of the individual. The camera is tilted under control of the computer to roughly position the individuals face vertically in the picture. Thereafter, the system adds or subtracts scan lines of the backdrop color above the face of the individual to finally position the face in the picture. The picture is also electronically adjusted for gamma and picture brightness.

17 Claims, 2 Drawing Sheets

IMAGE RECORDING FOR A DOCUMENT GENERATION SYSTEM

FIELD OF THE INVENTION

The present invention relates generally to image recording and document generation systems and, in particular, automated apparatus for input of images into a computer and the generation of identity documents using such images.

BACKGROUND OF THE INVENTION

In the prior art, documents such as identity cards, drivers licenses and passports required that an actual photograph be taken of an individual. The picture is then pasted or otherwise fastened to a base identity document on which is also placed the signature, thumbprint or other information concerning the individual. The base document may have preprinted thereon official seals, signatures and other information. To hinder altering documents such as drivers licenses the photograph is fastened to the base document and is then heat sealed between plastic sheets. However, such security measures have only been a hindrance, and individuals determined to alter an identity document such as a drivers license open the plastic laminate, change the photograph, and reseal the license between the plastic sheets. Thereafter, a quick inspection of an altered document will not disclose that the document has been tampered with.

The production of prior art identity documents has been very labor intensive and time consuming. The operator must manually type in information on the base identity document, must get the individual to whom the document is to be issued to sign the document, manually take a photograph, crop the photograph to the right size, fasten the photograph to the base document and, finally, seal the document between plastic sheets. If the photograph taken was too dark, the operator must manually adjust the camera and take another, lighter, photograph.

In addition, even with improved semi-automated equipment that is used to take a picture and then print it on a base document that is made of plastic, the camera used to take the picture must be manually aimed to center the image of the individual in the picture taken with the camera.

Thus, there is a need in the art for new techniques and equipment for producing identity documents that are not easily altered, and that can be produced quickly and easily in an automated manner with minimal intervention by the operator of the equipment.

There is also a need in the art for apparatus and a method for automatically aiming a camera to center the image of an individual in a picture taken with the camera.

SUMMARY OF THE INVENTION

The present invention solves the problems of the prior art. The operation of the computer based image recording system taught herein is automated to an extent that the operator of the equipment does not have to perform a number of the tasks performed in the prior art to create an identity document, yet a higher quality identity document is consistently produced. This speeds the production of such identity documents and reduces the number of human errors made in their production. In addition, the identity documents can have the photograph, signature, thumbprint and other personal identity information printed on the base identity document making it difficult, if not almost impossible, to alter the identity document.

Briefly, the imaging and document creation system comprises a computer with a control program; a CCD video camera for making a picture of, and then optical character reading, if necessary, cards with biographical data, signatures, fingerprints and other similar personal information thereon identifying an individual and storing the information in a data base; and the CCD video camera is used to take a picture of an individual, the picture is digitized and analyzed by the computer, and adjustments are automatically made to the camera and its physical position.

More particularly, during an initial calibration or setup phase of the system, the computer automatically controls the camera adjustments of the camera to initially set up the physical aiming, zoom, and brightness level of the camera. In this embodiment of the invention the video camera is preferably one of the Sony EVI family of video cameras.

In subsequent, actual operation, an individual stands in front of the camera before a backdrop of a known color and size. When a picture is taken of the individual, the video camera signal output is analyzed by the computer and, if necessary, the computer causes the camera's iris to be re-adjusted, and software processing of the picture is accomplished, to control the brightness of the picture to within acceptable levels. In addition, the video picture is processed by the computer to provide gamma correction to achieve a color picture with good overall contrast to bring out facial features, and the zoom control of the camera is controlled to achieve a uniform size of pictures of faces. The computer finally causes the picture to be electronically cropped to a pre-determined size, and the cropping is done in a way to center the face of the individual in the picture before it is stored and printed on an identity document being generated using the system.

During actual operation the computer also controls the operation of the another CCD video camera used to preferably scan one or more cards on which are located biographical data, signatures, fingerprints and other similar personal information identifying the individual for whom the identity document is being made. The computer performs optical character reading of the printed biographical data and stores the information in a file on the individual, and also takes pictures of the signature, fingerprints, and other similar personal information and stores the images in the file. In this embodiment of the invention the card scanner uses a small video camera or other high resolution PAL camera.

After all biographical information for an individual has been input to the system computer, a blank plastic card is inserted into a printer that utilizes dye diffusion printing on the card to produce a document, such as identity card or drivers license, which can only be altered with great difficulty. The printer, under control of the computer, prints on the plastic card governmental seals, authorizing signatures, other information, and the biographical information and picture of the individual to whom the finished identity card or drivers license is to be issued. A printer that can be used for this purpose is any sub-dye printer available from companies such as, but not limited to, Fargo and Eltron. The plastic cards may have pre-manufactured thereon holograms and other information, such as government seals, that indicate the authenticity of the card and make it near impossible to alter the cards.

DETAILED DESCRIPTION

Figure 1:
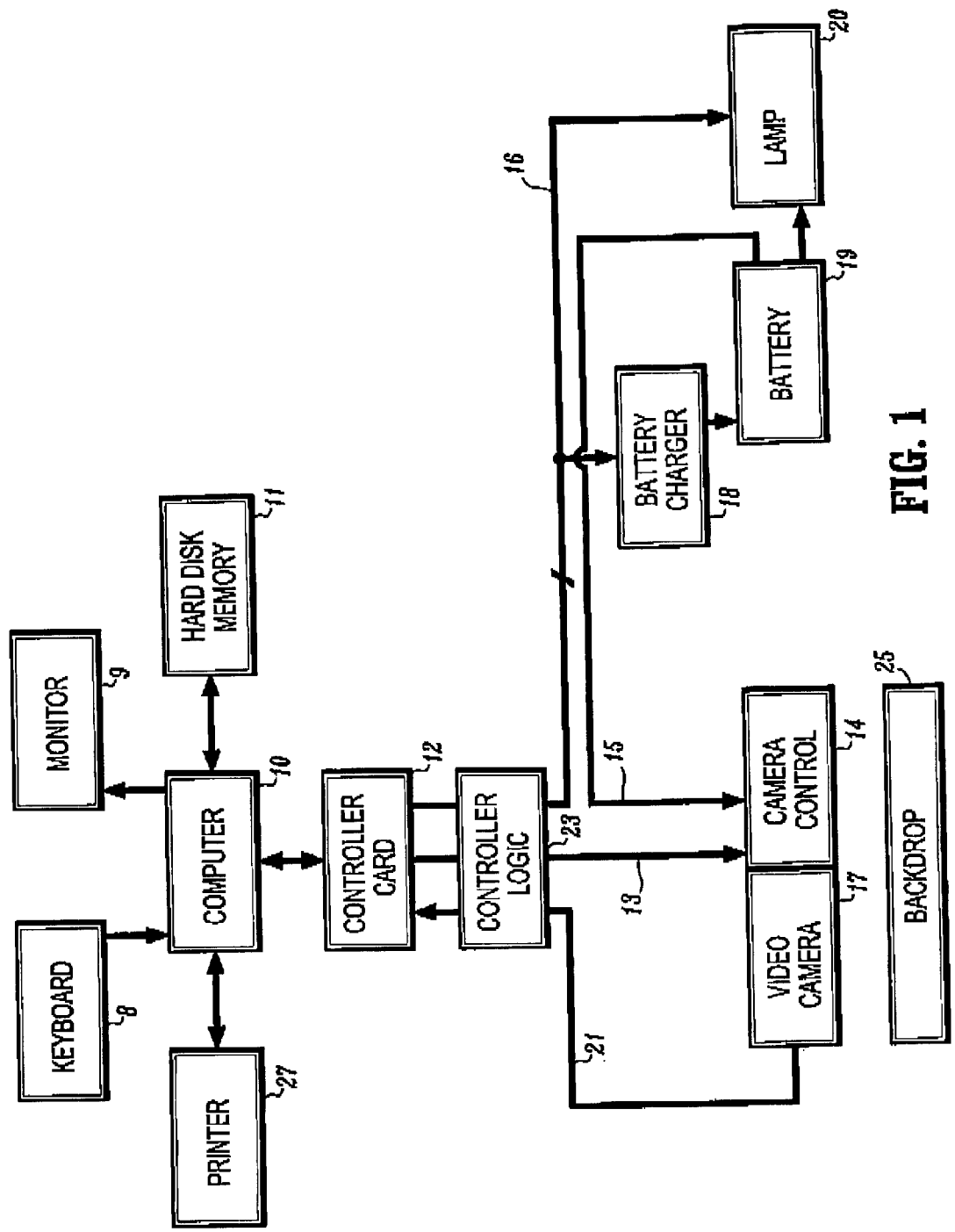
FIG. 1 is a detailed block diagram of an imaging and document creation system in accordance with the teaching of the present invention.

In FIG. 1 is shown a detailed block diagram of an imaging and document creation system (hereinafter "system") which includes the teaching of the present invention. The system utilizes a computer 10 that, in accordance with this embodiment of the invention, preferably uses a personal computer (PC) architecture that is readily available and relatively inexpensive. However, any computer may be used to implement the invention. Computer 10 has a monitor 9 and a keyboard 8 connected thereto that are both well known in the computer art and provide input and output means to computer 10. Computer 10 also has a hard disk memory 11 for storing the computer control program used in controlling the system, including implementing the invention, pictures taken with the system, and the biographical information input thereto, such as biographical data, signature and fingerprints used in the production of identity documents. Other identification information may also be stored such as a scan of a person's eye, and voiceprints and these may be expanded as technology expands and creates new identification indicia. Hard disk memories are well known in the computer art and are not described in further detail herein.

Inserted into a standard expansion slot of computer 10 is a controller card 12, unique to the system, that has a connector (not shown) on its rear that is used to connect the other major part of the system, the video subsystem, shown below controller card 12 in FIG. 1, together with computer 10. Controller logic 23 is part of the separate camera subsystem which also includes video camera 17, camera control 14, battery charger 18, battery 19 and lamp 20. Controller card 12 provides the interface between computer 10 and the camera subsystem as described hereinafter. The connectors on controller card 12 include a serial port 13 used for connection to and sending control signals via controller logic 23 in the camera subsystem to video camera control circuit 14 to thereby control all aspects of operation of camera 17 such as zoom, focus, iris, white balance and exposure mode. Camera control circuit 14 is an integral part of camera 17. Circuit 14 is shown separately only to understand some of the functions performed. The camera is preferably one of the readily available Sony EVI family of video cameras. However, other cameras may also be utilized.

Other connectors on controller card 12 supply power from the computer 10 power supply (not shown but well known in the art) through controller card 12 to battery charger 18 for recharging a rechargeable battery 19. Battery 19 supplies power to a number of circuits including controller card 23, lamp 20, camera control 14, and a tilt motors (not shown) that is part of video camera 17; and a signal to activate lamp 20 for calibration purposes and to momentarily illuminate an individual when their picture is to be taken using video camera 17. Camera control circuit 14 is shown physically adjacent to camera 17 since circuit 14 is in reality an integral part of camera 17. Circuit 17 includes the circuitry for controlling all aspects of the operation of camera 17 such as zoom, focus, iris diameter, exposure, and tilt.

Controller card 12 also provides an interface between computer 10 and frame grabber circuitry integral to the controller card, and that is described with reference to FIG. 2. The frame grabber circuitry in controller card 12 operates under control of the system program stored in hard disk memory 11 and run by computer 10, to capture the picture taken using camera 17 and information such as printed or typed data, a signature, fingerprints, and other identification indicia for an individual for whom an identity card is being produced using the system. The information and other identification indicia are scanned and entered into the system using a scanner that is not shown. The typed or printed information on the card is read using optical character reader software that is well known in the art and run using computer 10, while signatures and images are scanned and saved as image information. All the information input to computer 10 via the frame grabber in controller card 12 is stored in hard disk memory 11 in a data base associated with the individual for whom the identity card is being produced, and some or all of it may be used to produce the identity card. In an alternate embodiment of the invention all data and images can be sent over a communication link (not shown) to be stored at a central location from where it can also be accessed.

After the equipment of the system is set up and backdrop 25 positioned in front of video camera 17, the system is automatically calibrated to center the camera on backdrop 25. Backdrop 25 is spaced from the front of video camera 17 in the order of four feet when the system is set up for operation. Backdrop 25 has a central colored area that is thirty-six inches wide with five inch wide vertical white borders on either side, and backdrop 25 must have a height of at least eight feet. The thirty-six inches between the five inch white borders is colored chroma blue or gray. In the following description only chroma blue is mentioned. These colors are selected since it facilitates removing the colored backdrop from a picture taken with camera 17, if desired, leaving only the face that is stored in hard disk memory 11, in a manner well known in the video art. This reduces the size of stored picture files, and standard compression techniques can reduce the file sizes even further.

To better understand how calibration is accomplished, details of the output signal from video camera 17 must first be described. In this embodiment of the invention camera 17 outputs a standard NTSC 640×480 frame pixel output. After calibration, as described hereinafter, during each of the 480 pixel scan lines, camera 17 will see the left most vertical white border of backdrop 25 as pixels 0–30, the blue center area of backdrop 25 as pixels 30–610, and the right most vertical white border of backdrop 25 as pixels 610–640. A PAL 768×576 frame pixel output may also be used. During calibration left to right panning is accomplished with software, and not with physical movement of video camera 17. The software processes the video signal output from video camera 17, which is only generally aimed at the middle of backdrop 25, to locate the left most and right most vertical white borders of backdrop 25, and then to locate the mid point of the blue center area. This mid point is thereafter used as the horizontal center of the camera output. This is so even if camera 17 is physically pointed a little to the left or right of the mid point determined by the software, which is usually the case.

The next step during the calibration procedure is to adjust the picture size against backdrop 25. In the event that the width of the blue backdrop 25 is not measured as being 580 pixels wide, computer 10 sends a correction signal to controller logic 23 that processes the signal and sends a control signal to camera control 14 to adjust the zoom control of camera 17 until 580 chroma blue pixels are counted by computer 10. At this point the zoom reference number of camera 17 is read and stored. This step of the initial calibration is now completed.

Camera 17 has an automatic white balance that remains on so a white balance is not done as part of the initial calibration of the system.

The next step in the initial calibration process is to adjust the brightness control. To do this the system measures the brightness of the chroma blue background both with lamp 20 turned on and with lamp 20 turned off. These measurements are compared to a stored brightness level to be achieved, and computer 10 sends signals via controller card 12 to controller logic 23 which sends a control signal to camera control 14 to adjust the iris of camera 17 to achieve a course brightness level of the desired value. If the video signal is determined to be too bright, computer 10 sends a signal via controller card 12 to controller logic 23 that in turn sends a control signal to camera control 14 to close down the iris of camera 17 a small amount. The iris of camera 17 is opened a little if the video picture from video camera 17 is determined to be too dark. Subsequently a fine brightness level is electronically achieved while the equipment is in operation utilizing frame grabber 23. The initial calibration process is completed.

During actual operation of the equipment in taking a picture of an individual there is a second automatic calibration that takes place to center an individual's face in the picture being taken. This is the auto location step of calibration. An individual stands in front of backdrop 25, roughly centered left-right. At the commencement of operation camera 17 is caused to perform a full frame 640×480 scan. With an individual standing in front of backdrop 25 there is a blue band above their head and, accordingly, there will be a transition from the chroma blue backdrop color to the top of the persons head, and from the chroma blue to either side of the individual's head. Responsive to its stored program, computer 10 counts the number of chroma blue scan lines in the picture above the persons head and compares the number to a stored number indicating the desired number of all chroma blue scan lines to be above the persons head. If there are too few chroma blue scan lines computer 10 sends a correction signal via controller card 12 to controller logic 23 which responds thereto and generates a control signal to camera control 14 to mechanically tilt video camera 17 upward to thereby increase the number of chroma blue scan lines that will appear above the persons head. This process is repeated in a loop fashion until the desired number of chroma blue scan lines appear above the persons head. At that time computer 10 ceases sending the correction signal to controller logic 23, which in turn ceases generation of the control signal to camera 17, and a tilt motor (not shown) in video camera 17 ceases to operate.

More particularly, if computer 10 determines that there are forty too few chroma blue scan lines above the subjects head, it sends the correction signal via controller card 12 to controller logic 23 that generates the control signal to camera control 14 to energize the tilt motor (not shown) in camera 17 to tilt camera 17 upward to capture approximately twenty more chroma blue scan lines, and the above described comparison is repeated. This time there will be twenty too few chroma blue scan lines and computer 10 again sends a signal via controller card 12 and controller logic 23 to camera control 14 to tilt camera 17 upward to capture ten more chroma blue scan lines, and the above described comparison is again repeated. This step is repeated until the desired number of chroma blue scan lines appearing above the head of the individual whose picture is being taken. This sets the upper picture border above the individual's head. If there are too many chroma blue scan lines above a subjects head, the process just described is repeated but with the tilt motor aiming camera 17 in the opposite direction. This completes the auto location step of the calibration during operation.

It should be understood that the above described mechanical tilt operation is the preferred embodiment of the invention when pictures are being taken, but this operation may be changed. A software tilt function may be accomplished in the same manner as described above for left to right panning. Then there will be no physical movement of video camera 17 after it is initially placed in position by an operator setting up the system for operation. The software will merely analyze the picture output from video camera 17 when a picture is being taken and will crop the picture to include the correct number of chroma blue lines above the subject whose picture is being taken.

The auto location calibration step being completed, the NTSC 640×480 pixel picture output from camera 17 is stored and processed by electronically clipping the picture to create a final picture having a 480×480 pixel size with the individual's face properly centered in the picture. This final picture is used to create identity and other documents and is stored in memory 11. To assure that the individual's face is probably centered left to right in the final picture, a number of transition points from the chroma blue background to the left and right edges of the individual's head are first located. If the individual's head is off center in the picture, the electronic clipping is adjusted so that, on average, the number of chroma blue pixels in any scan line and on either side of the persons head are equal. This results in the individual's head being centered left to right in the final 480×480 picture.

After the auto location, but before the final picture taking and picture cropping described above, computer 10 analyzes the first picture taken by video camera 17. In response to a brightness level analysis of the picture a final electronic brightness level adjustment is made. This brightness processing of digitized pictures is well known in the digital picture processing art. If the brightness level is too far off the desired level, computer 10 sends a brightness correction signal via controller card 12 to controller logic 23 which in turn generates a control signal over lead 13 to camera control 14 to control the iris of camera 17 and re-adjust the brightness level of the picture. Computer 10 continues to analyze the picture signal output from video camera 17. When the brightness level is determined to be correct, computer terminates the correction signals it is generating. In turn, controller logic 23 ceases generation of the control signal it is sending to camera control 14 via lead 13. The brightness level is now corrected and the operation of the system continues.

In addition, gamma correction is applied to the color of the face by computer 10 to achieve better overall contrast and to better bring out facial features. The pixels at the middle of the face in the picture are sampled and compared to a stored "normal" value. Gamma correction is applied to the picture as a result of this comparison. This type of gamma correction is well known in the digital picture processing art.

When computer 10 determines that the picture taken using video camera 17 is acceptable it then processes the digitized video picture to crop the picture to the desired 480×480 pixel size, and further to remove the chroma blue background from the picture as described above. Computer 10 then stores the final picture on hard disk memory 11 and proceeds to produce the identity document.

The system is normally set up to automatically take pictures of persons who stand before backdrop 25 and in front of camera 17 as previously described. However, the system may be needed to take a picture of a person in a wheelchair. The person may not initially be in the field of view of video camera 17. When a person in a wheelchair is located in front of backdrop 25 before camera 17, the operator of the system manually re-aims the camera at the person in the wheelchair. Thereafter, the system operates in the manner described above to electronically center the face of the person in the wheelchair in a picture.

Camera control circuit 14 is shown adjacent to camera 17 since circuit 14 is in reality an integral part of camera 17. Circuit 17 includes the circuitry for controlling all aspects of the camera 17 operation such as tilt, zoom, focus, iris, white balance and exposure.

No detail is shown or described for a tilt motor control since they are both well known in the art. They are in use with all video camera surveillance systems in which the cameras are mounted on a base having pan and tilt motors that are controlled from a central location to point the camera under the control of a person at the central point.

As briefly described above, battery charger 18 is connected to the ISA or pCI bus 15 and receives power via the bus and controller card 12 and through controller logic 23 from a conventional power supply that supplies power to computer 10 to charge battery 19. By powering the battery charger in this manner there is no need to be concerned over different voltages and frequencies of line power in foreign countries where our novel system may be used. Battery charger 18 is used to build up a charge in battery 19 to be used to energize circuits as enumerated above, and also lamp 20 when a picture is to be taken. Such battery chargers and associated batteries are well known in the art and are used in many cameras, even the inexpensive variety in which dry cell batteries are used to charge a flash capacitor at a slower rate and then the charge in the flash capacitor is discharged at a faster rate to energize the flash lamp.

Lamp 20 is energized by a signal from computer 10 sent to controller logic 23, which in turn controls the operation of lamp 20, both during the initial calibration phase, and when a picture is to be taken of an individual (not shown) sitting or standing in front of backdrop 25 and before video camera 17.

When biographical data such as weight, age, birth date, height, race, and other such information is to be input to the image recording system it is manually input using keyboard 8 and is then printed by printer 27 on a card (not shown) in specific locations that are in a pre-determined spatial order. Other information such as signature, fingerprints and other indicia are also placed on the card or other cards in other pre-determined locations. The filled out card is inserted into a slot in the system. Frame grabber 23 also takes a picture of the signature, fingerprints and other such indicia and stores it as images on hard disk memory 11. Alternatively, the biographical data may be manually entered into computer 10 via its keyboard (not shown) or via other means known in the art but also not shown. The system is now ready to generate an identity document using all the stored data.

For the purpose of producing an identity document printer 27 is utilized. Printer 27 utilizes a die diffusion printing process. Such a printer that can be used for this purpose is available from companies such as Fargo and Eltron. Printer 27 utilizes special blank plastic cards (not shown) to produce identity documents such as driver's licenses, military identification cards, and other similar identification cards. Such a plastic card is inserted into printer 27 that, under control of computer 10, prints governmental seals, authorizing signatures, and other information on the plastic card; and also prints on the card the biographical information, signature, thumbprint, and picture of the individual to whom the finished identity card is to be issued. The plastic cards may have pre-manufactured thereon holograms and other information, such as government seals, that indicate the authenticity of the card and make it almost impossible to alter the cards.

Figure 2:
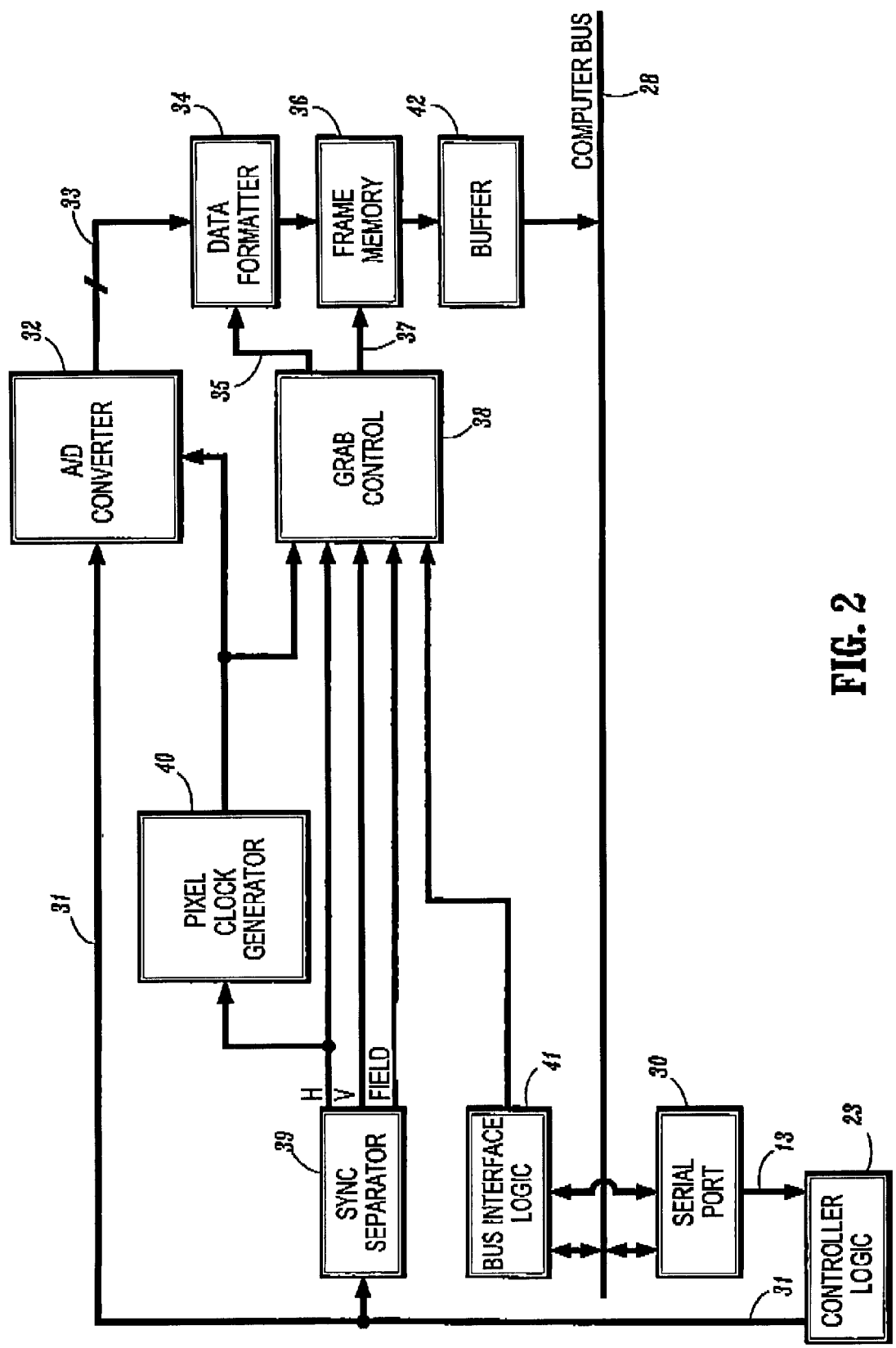
FIG. 2 is detailed block diagram of the controller that interfaces the computer with the video cameras, lamp, printer and other equipment of the imaging and document creation system.

In FIG. 2 is shown a detailed block diagram of controller card 12. Controller card 12 is inserted into a standard bus expansion slot in computer 10 in a manner well known in the art. The internal bus of computer 10 is shown in FIG. 2 as bus 28 and is the path via which computer 10 sends and receives signals to and from controller card 12 and other cards within the computer. Controller card 12 is based on an 8255CA controller chip from Intel Corporation, or an equivalent. This chip has three eight-bit inputs and a number of control leads. In the preferred operation one of the three eight-bit inputs to the 8255CA controller chip is used for the video bus 31 between controller card 12 and controller logic 23. Others of the inputs and control leads are used to send signals to and receive signals from controller logic 23 to control the operations of the camera subsystem and receive video signals therefrom as previously described.

Controller card 12 has a connector via which a connection is made to controller logic card 23 in the camera subsystem. All correction signals, control signals and video signals pass between cards 12 and 23 via the connector.

The analog video signal output from video camera 17 passes through controller card 23 and is input via lead 31 to analog to digital (A/D) converter 32. The analog video signal may be in NTSC or PAL formats, but in the embodiment of the invention described herein the analog video signal is in NTSC format. Converter 32 converts the analog video signal into a digital video signal on serial bus 33 that is input to a data formatter 34. Data formatter 34 is under the control of control signals on lead 35 to convert the digital output from A/D converter 32 into a string of digital numbers in a proper timing sequence with the original analog video signal. The output from data formatter 34 is stored in frame memory 36 under control of control signals on lead 37 from grab control circuit 38.

As the analog video signal from video camera 17 is input to A/D converter 32, the signal is also input to sync separator 39 that provides outputs of horizontal sync pulses, vertical sync pulses, and odd or even field indication for interlace respectively on leads H, V and Field. The horizontal sync pulse from sync separator 39 is input to pixel clock generator 40 to produce a pixel or dot clock output that is applied to A/D converter 32 to aid in the digitization of the analog video signal.

The horizontal and vertical sync pulses, and odd or even field indication from sync separator 39, and the pixel clock signal from pixel clock generator 40 are input to grab control circuit 38 that provides control signals to data formatter 34 and to frame memory 36.

Computer 10 sends control signals to controller card 12 via bus 28 that are received by bus interface logic 41. Some of these control signal are passed via serial port connector 30 to the external circuits to which it is connected as shown in FIG. 1. Other signals from computer 10 on bus 28 are passed directly to or from serial port 30 to the circuits shown in FIG. 1 that are connected to these ports.

Bus interface logic 41 also receives signals from computer 10 via computer bus 28 to control the operation of grab control 38 to capture, store and forward video pictures, in digital format, from buffer 42 to computer 10 via bus 28 to be stored and analyzed. To do this the digitized video picture in frame memory 36 is transferred to buffer 42 from where computer reads the video picture, in digital format, to be stored in hard disk memory 11 associated with computer 10.

In operation an individual for whom an identity document, such as a drivers license, will be made comes to the system operator at an appointed time. With them they will bring a card on specific areas of which are printed biographical information regarding the individual. This biographical data will include name, address, color of hair and eyes, weight, social security number, and other information. Before the operator of the system the individual will sign their signature in a specific area on the card. The individual may also have their thumb print placed in another specific area on the card. The individual then stands in front of video camera 17. Behind the individual is backdrop 25. The card is inserted in a slot of a scanner that is used to scan the card and transfer the data to computer 10 via controller card 12 as previously described. The individual's picture is taken and, after processing as previously described, is stored by computer 10 in image form in hard disk memory 11.

After all information, picture and other images have been input to the system as described above computer 10 energizes printer 27. The operator of the system inserts a special plastic card into printer 27 and computer 10 then controls the printer to generate an identity document for the person. On that identity document, if it is a drivers license, is printed the picture of the person, their signature and fingerprint(s), their biographical data such as address, birth date, blood type, and social security number; and also printed on the card are seals, authorizing signature and other information specified by the state that is issuing the drivers license. Due to the manner in which this card is printed it is almost impossible for anyone to modify the card.

While what has been described above is a preferred embodiment of the invention, it will be understood by those skilled in the art that many changes may be made without departing from the spirit and scope of the invention. Further, as technology advances other identification information can be input to our novel system. For example, there is work being done regarding mapping a persons eye. An eye scanner can be connected to our novel system and the output therefrom can be stored in the database created using the system.

What is claimed is:

1. A method for setting up and adjusting computer controlled video camera equipment used to take a picture of a person that will be positioned before a colored backdrop in front of the camera, the backdrop having left and right borders of one color and a known width, and a central area of another color and a known width, the camera having a tilt mechanism for pointing said camera vertically and having zoom, focus and brightness adjustments that may be adjusted responsive to signals from a computer, said method comprising the steps of:

locating the position of the borders and using that information and the known width of the central area of the backdrop to locate the vertical center of the backdrop;

taking a picture of a person in front of the backdrop; and horizontally centering the image of the person in the picture by adding and subtracting the another color to either side of the image of the person to substantially have an equal amount of the another color on the left and right side of the image of said person in the picture.

2. The method in accordance with claim 1 further comprising the steps of:

manually aiming said camera toward the middle of the backdrop during set up of the computer controlled video camera equipment; and vertically centering the image of the person in the picture by adding or subtracting scan lines of the another color above the image of the person in the picture to substantially have a predetermined amount of the another color on the top side of the picture.

3. The method in accordance with claim 2 wherein the step of vertically centering the image of the person in the picture comprises the steps of:

locating the top of the head of the person in the picture by sensing a transition from the another color at the top of the picture;

comparing the number of scan lines of the another color above the top of the head of the person in the picture is sensed to a predetermined number of scan lines; and modifying the number of scan lines of the another color at the top of the picture to match the predetermined number of scan lines by adding or subtracting scan lines having the another color to thereby vertically center the image of the person in the picture.

4. The method in accordance with claim 3 wherein the step of horizontally centering the image of the person comprises the steps of:

counting the number of pixels of the another color on either side of the image of the person in the picture taken with the camera; and modifying the number of pixels of the another color on either side of the image of the person in the picture so they are equal by adding or subtracting columns of pixels having the another color to thereby horizontally center the image of the person in the picture.

5. The method in accordance with claim 1 further comprising the steps of:

counting the number of scan lines of the another color at the top of the picture until a transition from the another color to the top of the head of the image of the person in the picture is detected;

comparing the number of scan lines of said another color until the top of the head of the image of the person in the picture is sensed against a predetermined number of scan lines; and moving said camera vertically in a direction to better center the image of the person in the picture by having the number of scan lines of the another color above the top of the head of the image of the person in the picture closer to said predetermined number of scan lines.

6. The method in accordance with claim 5 further comprising the step of better centering the image of the person vertically in the picture by adding or subtracting scan lines of the another color above the image of the person to have the predetermined amount of another color on the top side of the image of the person in the picture.

7. The method in accordance with claim 6 wherein the step of horizontally centering the image of the person comprises the steps of:

counting the number of pixels of the another color on either side of the image of the person in the picture taken with the camera; and modifying the number of pixels of the another color on left and right side of the image of the person in the picture so they are equal by adding or subtracting columns of pixels having the another color to the left or right side of the picture and thereby horizontally center the image of the person in the picture.

8. The method for setting up and adjusting the computer controlled video camera equipment in claim 7 further comprising the step of changing the zoom adjustment of the video camera so the horizontal distance between the left and right borders is a predetermined value.

9. The method for setting up and adjusting the computer controlled video camera equipment in claim 8 further comprising the step of measuring the brightness of the backdrop and changing the iris adjustment of the video camera so that a predetermined brightness level is achieved.

10. The method for automatically setting up and adjusting the computer controlled video camera equipment in claim 9 further comprising the step of adjusting the brightness and gamma of the picture to match predetermined settings to achieve better overall contrast and to bring out facial features of the person whose picture has been taken.

11. The method for setting up and adjusting the computer controlled video camera equipment in claim 4 further comprising the step of changing the zoom adjustment of the video camera so the horizontal distance between the left and right borders is a predetermined value.

12. The method for setting up and adjusting the computer controlled video camera equipment in claim 11 further comprising the step of measuring the brightness of the backdrop and changing the iris adjustment of the video camera so that a predetermined brightness level is achieved.

13. The method for automatically setting up and adjusting the computer controlled video camera equipment in claim 12 further comprising the step of adjusting the brightness and gamma of the picture to match predetermined settings to achieve better overall contrast and to bring out facial features of the person whose picture has been taken.

14. A method for setting up and adjusting computer controlled video camera equipment used to take a picture of a person that will be positioned before a colored backdrop in front of the camera, the backdrop having left and right borders of one color and a known width, and a central area of another color and a known width, the camera having a tilt mechanism for pointing said camera vertically and having zoom, focus and brightness adjustments that may be adjusted responsive to signals from a computer, said method comprising the steps of:

manually aiming said camera toward the middle of the backdrop during set up of the computer controlled video camera equipment; and vertically centering the image of the person in the picture by adding or subtracting scan lines of the another color above the image of the person in the picture to substantially have a predetermined amount of the another color on the top side of the picture.

15. The method in accordance with claim 14 wherein the step of vertically centering the image of the person in the picture comprises the steps of:

locating the top of the head of the image of the person in the picture by sensing the transition from the another color at the top of the picture;

comparing the number of scan lines of the another color above the top of the head of the image of the person in the picture to a predetermined number of scan lines; and modifying the number of scan lines of the another color at the top of the picture to match the predetermined number of scan lines by adding or subtracting scan lines having the another color to thereby vertically center the image of the person in the picture.

16. The method for setting up and adjusting the computer controlled video camera equipment in claim 15 further comprising the step of changing the zoom adjustment of the video camera so the horizontal distance between the left and right borders is a predetermined value.

17. The method for setting up and adjusting the computer controlled video camera equipment in claim 16 further comprising the steps of:

measuring the brightness of the backdrop and changing the iris adjustment of the video camera so that a predetermined brightness level is achieved; and adjusting the gamma of the picture to match predetermined settings to achieve better overall contrast and to bring out facial features of the person whose picture has been taken.

* * * * *